United States Patent
Smith et al.

(10) Patent No.: US 8,506,303 B1
(45) Date of Patent: *Aug. 13, 2013

(54) SYSTEM AND METHOD FOR INTERACTIVE KNITTING FUNCTIONS

(71) Applicants: Jeffrey Blair Smith, Newmarket (CA); Sally A. Holt, Lakewood, CO (US)

(72) Inventors: Jeffrey Blair Smith, Newmarket (CA); Sally A. Holt, Lakewood, CO (US)

(73) Assignee: Create2Thrive Inc., Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,789

(22) Filed: Oct. 16, 2012

Related U.S. Application Data

(63) Continuation of application No. 13/549,254, filed on Jul. 13, 2012.

(51) Int. Cl.
*G09B 19/20* (2006.01)
(52) U.S. Cl.
USPC .................................................. 434/95
(58) Field of Classification Search
USPC ........................................... 434/91, 95
See application file for complete search history.

(56) References Cited

U.S. PATENT DOCUMENTS

| | | | | |
|---|---|---|---|---|
| 2,078,646 A * | 4/1937 | Treinis | | 434/95 |
| 2,511,947 A * | 6/1950 | Samuels | | 66/1 A |
| 3,826,907 A * | 7/1974 | Milfait | | 714/824 |
| 3,983,370 A * | 9/1976 | Caspi et al. | | 700/141 |
| 3,995,379 A * | 12/1976 | Werber | | 434/95 |
| 4,040,277 A * | 8/1977 | Kahan et al. | | 66/232 |
| 4,078,401 A * | 3/1978 | Kamikura et al. | | 66/75.2 |
| 4,346,366 A * | 8/1982 | Kajiura et al. | | 700/141 |
| 4,391,591 A | 7/1983 | Hamburger | | |
| 4,578,036 A * | 3/1986 | Leighton | | 434/95 |
| 4,792,305 A | 12/1988 | O'Donnell | | |
| 5,353,355 A * | 10/1994 | Takagi et al. | | 382/111 |
| 5,388,050 A * | 2/1995 | Inoue et al. | | 700/131 |
| 5,812,110 A | 9/1998 | Kawasaki et al. | | |
| 6,895,787 B2 * | 5/2005 | Maeiwa | | 66/232 |
| 7,460,927 B1 | 12/2008 | Lai | | |
| 7,650,018 B2 * | 1/2010 | Tetsuji | | 382/111 |
| 7,657,341 B2 | 2/2010 | Lind | | |
| 7,738,990 B2 | 6/2010 | Furukawa et al. | | |
| 2005/0039494 A1* | 2/2005 | Maeiwa | | 66/202 |
| 2005/0166143 A1* | 7/2005 | Howell | | 715/523 |
| 2008/0003546 A1* | 1/2008 | Dunbar et al. | | 434/95 |
| 2009/0222127 A1* | 9/2009 | Lind | | 700/132 |
| 2012/0282575 A1* | 11/2012 | Solomon | | 434/95 |

OTHER PUBLICATIONS

U.S. Appl. No. 13/549,254, filed Jul. 13, 2012, Smith et al.
Official Action for U.S. Appl. No. 13/549,254 mailed Feb. 25, 2013, 8 pages.

* cited by examiner

*Primary Examiner* — Robert J Utama
(74) *Attorney, Agent, or Firm* — Sheridan Ross PC

(57) ABSTRACT

Systems and methods of transforming existing sets of instructions into a comprehensive user guidance experience for presentation and use by a user, and more particularly, to systems and methods of constructing a knitted garment from disparate instructional content. More particularly, the method includes receiving content from one or more instructional manuals, modifying the received content, selecting instructional content parts of interest, adding and editing additional sub-part content such as reference material or user-specific content to the parts of interest, assembling the instructional sub-parts and parts into an integrated scheme for presentation provided to a user, and tracking the users progress through the integrated instructional scheme. The instructional content may be received in text or graphical format. The integrated instructional scheme may be presented to the user via a graphical user interface.

20 Claims, 8 Drawing Sheets

SYSTEM AND METHOD FOR INTERACTIVE KNITTING FUNCTIONS

CROSS REFERENCE TO RELATED APPLICATIONS

The present application is a continuation of U.S. application Ser. No. 13/549,254 filed on Jul. 13, 2012, entitled "SYSTEM AND METHOD FOR INTERACTIVE KNITTING FUNCTIONS" the entire content of which is incorporated herein by reference in its entirety for all purposes.

FIELD OF THE INVENTION

The present invention relates to a method of transforming existing sets of instructions into a comprehensive user guidance experience for presentation and use by a user, and more particularly, to systems and methods of constructing a knitted garment from disparate instructional content.

BACKGROUND OF THE INVENTION

Traditional document-based instruction manuals are generally linear and when intended to be printed they are segmented. Content is often placed for efficiency of storage and not for efficiency of comprehension. The nature of instruction documents or manuals lends itself to reading or printing as pages; it does not lend itself to actually comprehending or executing the instructions.

Furthermore, traditional instruction manuals are often long and complex with many different options. Instructions for a single sub-task are typically spread across more than one column or page and such pages are routinely non-contiguous pages. Also, instruction manuals may provide reference material such as keys, legends, abbreviations, and other instructions that apply across several steps of the process. Additionally, the ordering of sub-tasks for completing instructions may not follow physical ordering in the instruction manual. Further, instructions frequently require two or more instructions to be followed simultaneously. Finally, instructions are always created and finalized before the user ever starts reading them. There is no meaningful mechanism for allowing the user to interact with the instructions, or track their progress through those instructions.

Frequently a user of a traditional instruction manual will spend a significant amount of time flipping between manual pages to complete a step or use the embedded reference materials. They will need to write notes about how each step may be related to others, or which steps need to be reworked due to incomplete or faulty instruction. Re-work is constant, as steps that must be done together are not clearly labeled in one spot resulting in missed instructions. Multiple options may result in mistakes and make it difficult to track current progress against the instructions. Progress through the instructions may even be negative, meaning that the user may need to go backwards and undo certain instructions.

In the construction of garments in the fiber arts, for example in the knitting of garments or portions of garments, the difficulty and limitations of traditional instruction manuals and traditional instruction sets is particularly evident. For example, knitting instructions are typically provided in a linear fashion with content distributed across multiple pages. The instructions are traditionally in both text format and in graphical or knitting chart format, and require simultaneous engagement with parallel instructions such as reference notes. For example, knitting an entire sock may require combining knitting charts for each of a cuff portion, a leg portion, heel portion and a toe portion. However, such required integration is difficult to perform with traditional systems, and typically requires the user to mentally remember critical aspects of combining the individual portions.

Some attempts have been made to modify traditional instruction manuals and/or sets of instructions to improve their usability and generally heighten the user guidance experience.

One example of a system or method that attempts to improve the user experience when navigating and engaging a set of instructions is U.S. Pat. No. 4,792,305 issued to O'Donnell on Dec. 20, 1988 ("O'Donnell"). O'Donnell discloses a collimated knitting pattern instruction panel for instructing a user in the creation of knitwear having patterns thereon which are formed into columns. The knitwear consists of multiple rows of yarn each having at least two groups of stitching configurations, with each of the groups of stitching configurations defining a portion of a particular pattern. In addition, a plurality of a particular one of the groups of stitching configurations form one of the columns on the knitwear. The collimated knitting pattern instruction panel comprises at least two elongated panel members, with each of the panel members having two horizontal edges and two side edges. At least one of the side edges of a first one of the panel members is in juxtaposition with one of the side edges of a second one of the panel members. Each of the panel members has a plurality of rows of alphanumeric characters with each of the rows being knitting pattern instructions for a particular one of the groups of stitching configurations, whereby the knitting pattern instructions for one of the columns of knitwear patterns are collimated into one of the panel members. While O'Donnell is of value in assisting a user in executing a set of instructions, there is no ability to edit or integrate the instructions or tune the instruction material for a particular user. O'Donnell is herein incorporated by reference in its entirety for all purposes.

Another reference that discloses method that assists a user in navigating and engaging a set of instructions that allows some user specialization is U.S. Pat. No. 6,895,787 issued to Maeiwa on May 24, 2005 ("Maeiwa"). Maeiwa discloses a system intended to quickly display a simulation image of knitting stitches approximate to an actually-knitted fabric. When an image is present in the position of the knitting stitches corresponding between an upper layer and a lower layer, the images of knitting stitches for pattern or transformed knitting stitches in the upper layer having the highest priority are displayed. In each layer, it is possible to perform an editing operation of selecting combinations of knitting stitches previously registered in a form of a module from a library and to change the position and the shape of the image of the knitting stitches. The knitting stitches in the periphery of the knitting stitch for a pattern are substituted for the transformed knitting stitches reflecting the influence of the making of the knitting stitch for pattern. Image data on basic knitting stitches, the knitting stitch for a pattern, and transformed knitting stitches is created utilizing the images of actual knitted fabrics or computer graphics and is stored. By combining the stored image data, a simulation image of knitting stitches like that of an actually knitted fabric can be quickly displayed. While Maeiwa does allow some user specialization, there is no ability to edit or integrate the instructions. Maeiwa is herein incorporated by reference in its entirety for all purposes.

U.S. Pat. No. 5,812,110 issued to Kawasaki on Sep. 22, 1998 ("Kawasaki") provides a user interface to assist user in navigating and engaging a set of instructions. Kawasaki discloses a method of displaying a stitching image particularly for a plating stitch. A screen of a display unit displays a stitch structure including a type of thread for each stitch of a knit fabric. The display area of each stitch is divided into a ground yarn display area and a plating yarn display area based on the type of stitch. The ground yarn is allocated to one of the divided areas while the plating yarn is allocated to the other of the divided areas. Kawasaki does not provide a comprehensive approach to editing and integrating instructional content. Kawasaki is herein incorporated by reference in its entirety for all purposes.

U.S. Pat. No. 7,460,927 issued to Lai on Dec. 2, 2008 ("Lai") provides an approach to digitizing some steps in manufacturing knitted products. Lai discloses a method of manufacturing knitted fabrics, more particularly a method of transferring a painting artwork onto a knitted fabrics to show the artistic verve of the painting. The manufacturing method includes the steps of: inputting an original drawing into a computer for digitization; editing and designing the digitized original drawing on a knitted fabric; outputting a knitting square plot after a graphic software performs a color processing; introducing graphic file information analyzed and processed by a knitting software to a knitting machine; and operators following a lamp signal of the knitting machine and the knitting square plot to knit to shape a knit piece, so as to complete a fashioned fine-art knitted fabric. Lai does not provide an approach to edit or integrate instructions for an efficient and user-specialized experience. Lai is herein incorporated by reference in its entirety for all purposes.

U.S. Pat. No. 4,078,401 issued to Kamikura on Mar. 14, 1978 ("Kamikura") discloses some user control in a digitized knitting operation. Specifically, Kamikura discloses a method and apparatus for providing patterning instructions in a knitting machine by reading a program carrier and converting the readings to digital signals to be stored in a memory means. A manually operable member cooperating with the reading means allows the instructions to be recalled from memory to be selectively determined for controlling for the knitting operation. While Kamikura does digitize some portions of an instruction set for a knitting operation, no comprehensive approach to editing and integrating instructional content is provided. Kamikura is herein incorporated by reference in its entirety for all purposes.

U.S. Pat. No. 7,738,990 issued to Furukawa on Jun. 15, 2010 ("Furukawa") provides an approach to digitizing some steps of a knitting operation and provides a user interface to assist a user in navigating and engaging a set of instructions. More specifically, Furukawa discloses a knitting structure model generated from knitting structure data represented by specific symbols so that an individual can easily imagine what type of knit fabric will be knitted. A knitting structure data acquiring portion acquires knitting structure data made up of symbols representing a tuck, representing a welt, and representing a knit. A node aligning portion aligns nodes representing connecting points of yarns forming the knit fabric within the plane in a lattice form. A simplified model generating portion generates a simplified knitting structure model by connecting the nodes aligned within the plane with edges corresponding to the yarns according to the knitting structure data. A display portion displays the simplified knitting structure model thereon. Furukawa does not provide a comprehensive approach to editing and integrating instructional content. Furukawa is herein incorporated by reference in its entirety for all purposes.

Lastly, U.S. Pat. No. 7,657,341 issued to Lind on Feb. 2, 2010 ("Lind") discloses a system that allows some user interaction with knitting instructions that allows limited modification of the knitting instructions. More specifically, Lind discloses a system usable by a processor to enable a user to select a type of garment and view an image of the pattern for the garment. Under direction of the system, the processor enables the user to input data relating to the characteristics of an intended wearer of the garment. The processor generates knitting instructions, indications of varying degrees of pressure applied by garments to a graphical model, and printings of pattern representations of pattern providers. Lind, however, does not provide a comprehensive approach to editing and integrating instructional content for an efficient and user-specialized experience. Lind is herein incorporated by reference in its entirety for all purposes.

While these references may be adequate for their intended purpose, there is still a need for systems and methods of transforming existing sets of instructions into a comprehensive user guidance experience for presentation and use by a user. More particularly, there is a need for systems and methods of constructing a knitted garment from disparate instructional content.

Although some physical and electronic systems for reading, annotating and marking up instructions are available, they do not solve the fundamental issues of working with complex instruction manuals. Traditional approaches are intended to store and print content efficiently rather than provide optimal viewing for comprehension of the content and accuracy of progressing through the instructions. Accordingly, there is a need for an electronic mechanism for streamlining and simplifying the "reworking" of instruction manuals such that the user (either the publisher or the reader/user) can process those instructions to their particular selected options and have complete information for completing each instructional step available during that step (including multiple instructions at the same time and reference material). There is a need to transcend the "flat" content of a document and transform such documents into an encompassing, time-based user guidance experience. The above deficiencies in working with complex instruction manuals are reduced or eliminated by the disclosed method.

SUMMARY OF THE INVENTION

In accordance with the present invention, a method of transforming an existing set of instructions into a comprehensive user guidance experience, and more particularly, to a method of constructing a knitted garment from disparate instructional content, is provided. In a preferred embodiment, the method includes receiving content from one or more instructional manuals, modifying the received content, selecting instructional content parts of interest, adding and editing additional sub-part content such as reference material or user-specific content to the parts of interest, assembling the instructional sub-parts and parts into an integrated scheme for presentation provided to a user, and tracking the users progress through the integrated instructional scheme. The instructional content may be received in text or graphical format. The integrated instructional scheme may be presented to the user via a graphical user interface.

Generally, the method includes a process for selecting parts (or subparts of instructions)—and by inference de-selecting unnecessary parts, a process for combining two parts together in a logical way based on the configuration of each of the parts, a process for specifying reference material, a method for ordering parts into logical sequence, and a process for specifying parallel instruction sets. In addition the method also involves a process for tracking progress against instructions (by part and within a part) over time. Further, during this process, net new (meta) information is gathered. This is information above and beyond that which the publisher published in the original manual. Examples of such information may include combined sizes of extracted or reconfigured content, or implicit or explicit links between instructions. This information is net new because the original format of the instruction manual (being linear in nature) simply prohibits it.

In one embodiment, the method allows for selecting, reordering, and combining multiple parts and subparts of instruction manuals so that sub-tasks are meaningfully arranged and composed from all relevant information from the source manual, processed into a richer format, and combined with "net new" content (including content that is added dynamically throughout the user's progression through the new instruction format.)

The method consists of selecting specific parts (layout not-withstanding) from one or more pages or parts of pages from the original instructions. Selection includes keeping relevant information and discarding what is not needed (optional or irrelevant information). These selected parts can be assembled into a single part to form a set of instructions for a particular task within the overall instructions. Selection can also result in templates for re-use in assembling one or more parts. Parts can then be ordered logically for a given set of options and completion/progress against tasks within a part or by part can be tracked. Selection is also applied to general information such as keys, legends, abbreviations, and other reference material that may be available within the instructions and used throughout execution. Selection and assembly can also be applied to instructions that require two or more simultaneous instructions to be followed at once.

The method also consists of providing facilities for the user to add net new content (either before starting or during execution of the instructions,) and to track their progression through the instructions.

In one embodiment, the method comprises four steps: 1) modifying the format (location, orientation and scale) of existing content; 2) creating a new layout (assembling this 'modified' content in a more comprehensive and encompassing way, creating association or links between this newly formatted content) for the content; 3) adding new content (and meta-information) to support inaccurate, missing or confusing instructions; and 4) supporting and tracking the user's experience and progression through the instructions.

The layout provides several levels of depth in supporting the user experience of following instructions and directly supports the provided specified formats. It is important to note that the layout transcends the original instruction content. The layout is not intended to simply show the original instruction content one piece at a time, it is intended to show more content, properly assembled content, related (reference and parallel instruction) content, and most importantly to track the user progression through the instructions.

The layout is achieved at three distinct levels. First, content is selected (subsections of instructional pages) such that parts contain needed instructional content—excluding irrelevant and unnecessary content. Instructional manuals—which are usually created to be read like a book, or printed on paper—contain content that is often confusing, inappropriately aligned or oriented or scaled. All unnecessary content and formatting is removed, such thatt he best content for the next layout level is produced. During this level of layout, meta-information from the user about the sub-part is also gathered.

The next level of layout is the assembly phase. Previously selected parts are assembled into "final" parts. These parts are made up of sub-parts cropped from original instructions, but they are also aligned, oriented and scaled, so that the final part shows the instructions in a much more complete, correct and easy to understand way. During the assembly phase, additional meta-information from the user is gathered about the final part.

The third level of layout is done outside of the parts themselves. This layout is achieved when links are created between final-parts and other net new content. During this process the meta-information that the user entered during the previous two layout levels is used, and allows the user to link two or more final parts, or add various types of content to the association. Once these links or associations are created, they can be accessed during execution of the instructions.

Additional features and advantages of the present invention will become apparent from the detailed description that follows, taken in conjunction with the accompanying drawings.

The term "fiber-based garment" means any garment constructed of fibers and includes knitted garments.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "screen," "touch screen," or "touchscreen" refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. Thus, in embodiments, the screen can enable the user to interact with the device by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
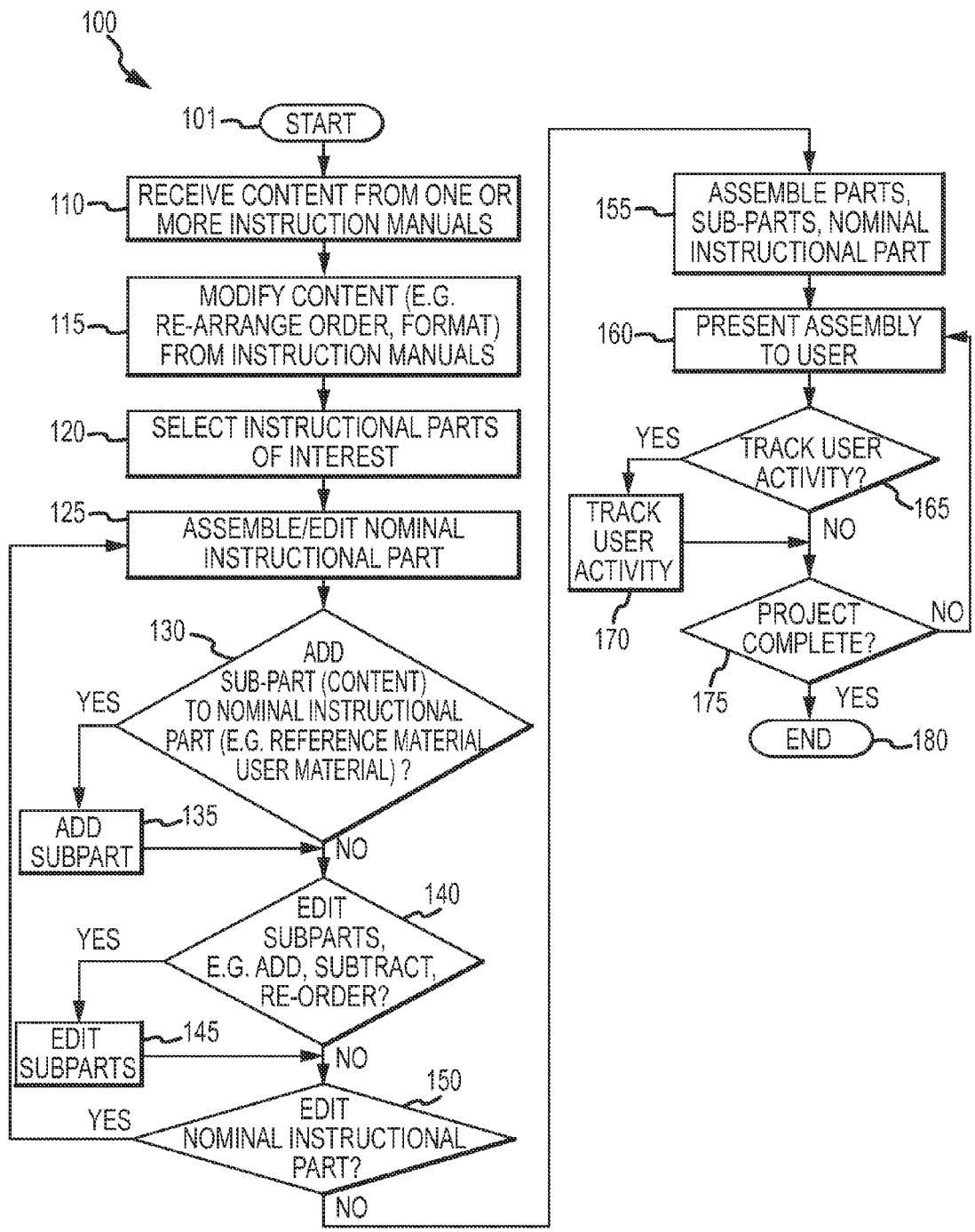
Figure 2:
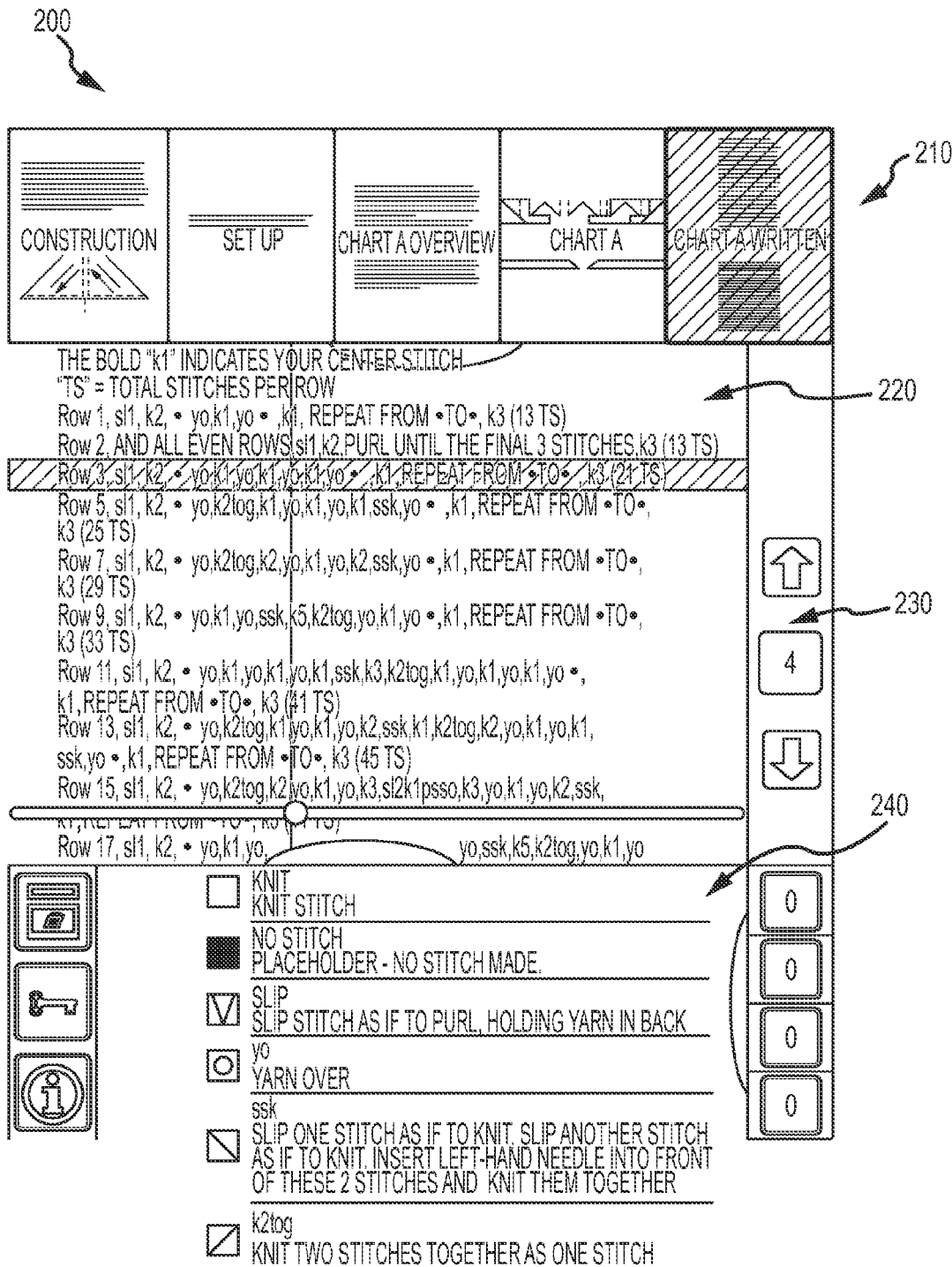
Figure 3:
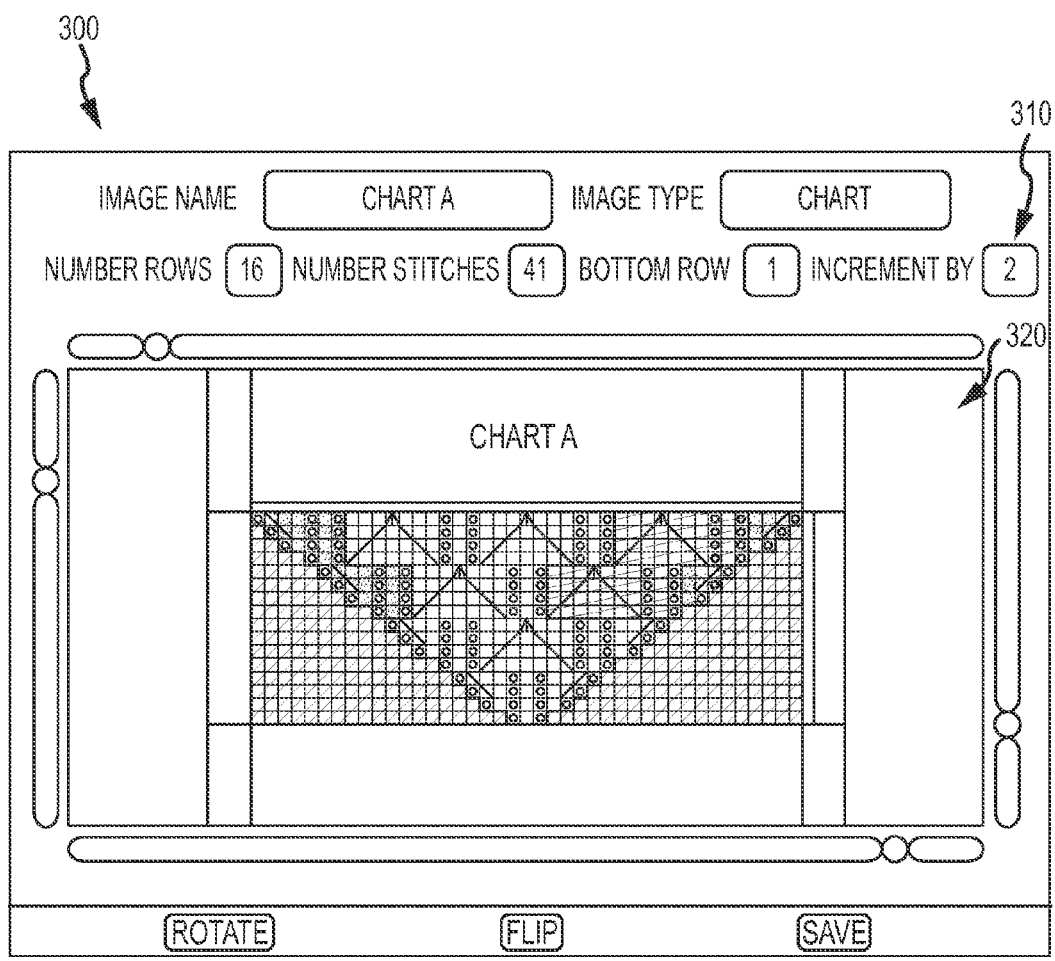
Figure 4:
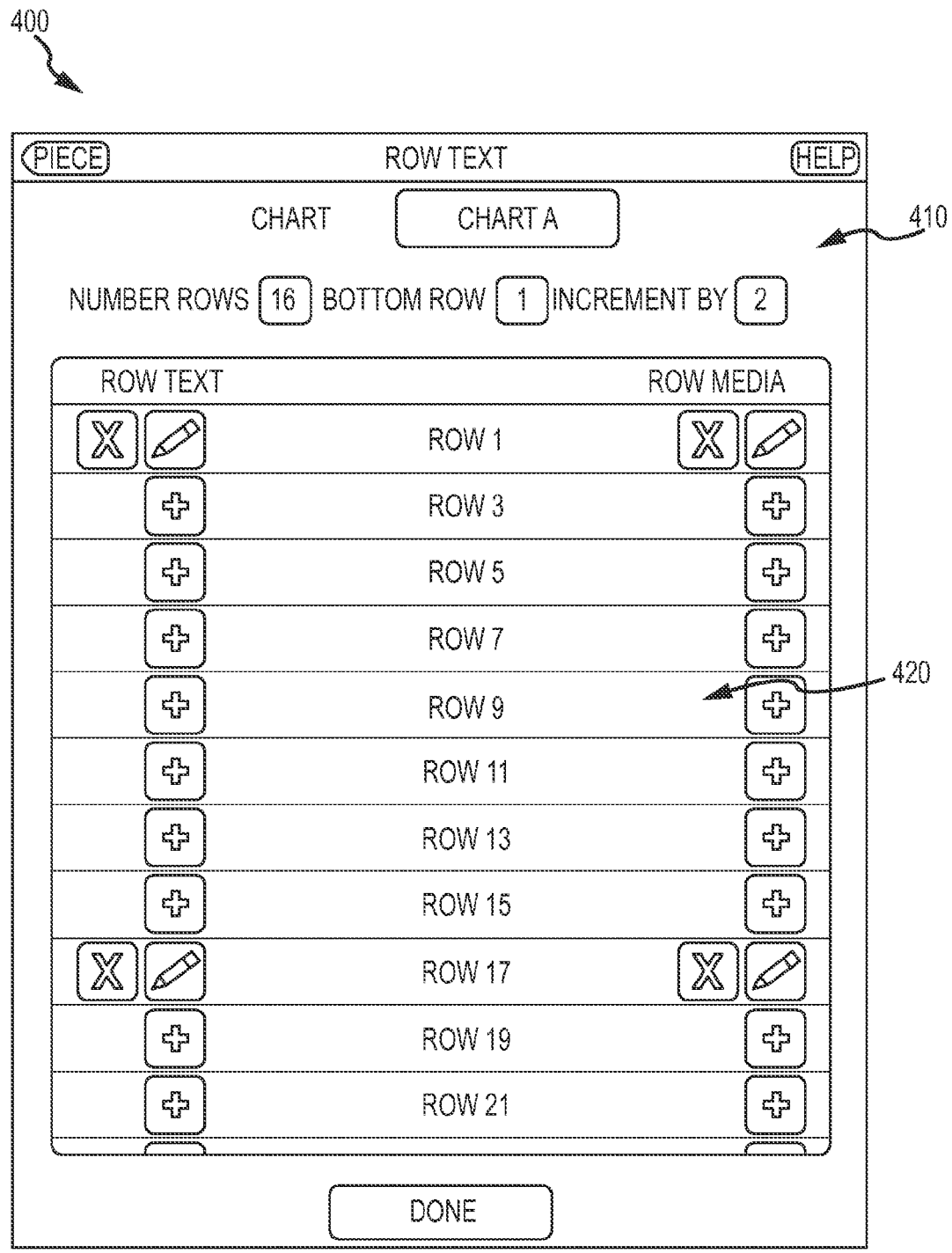
Figure 5:
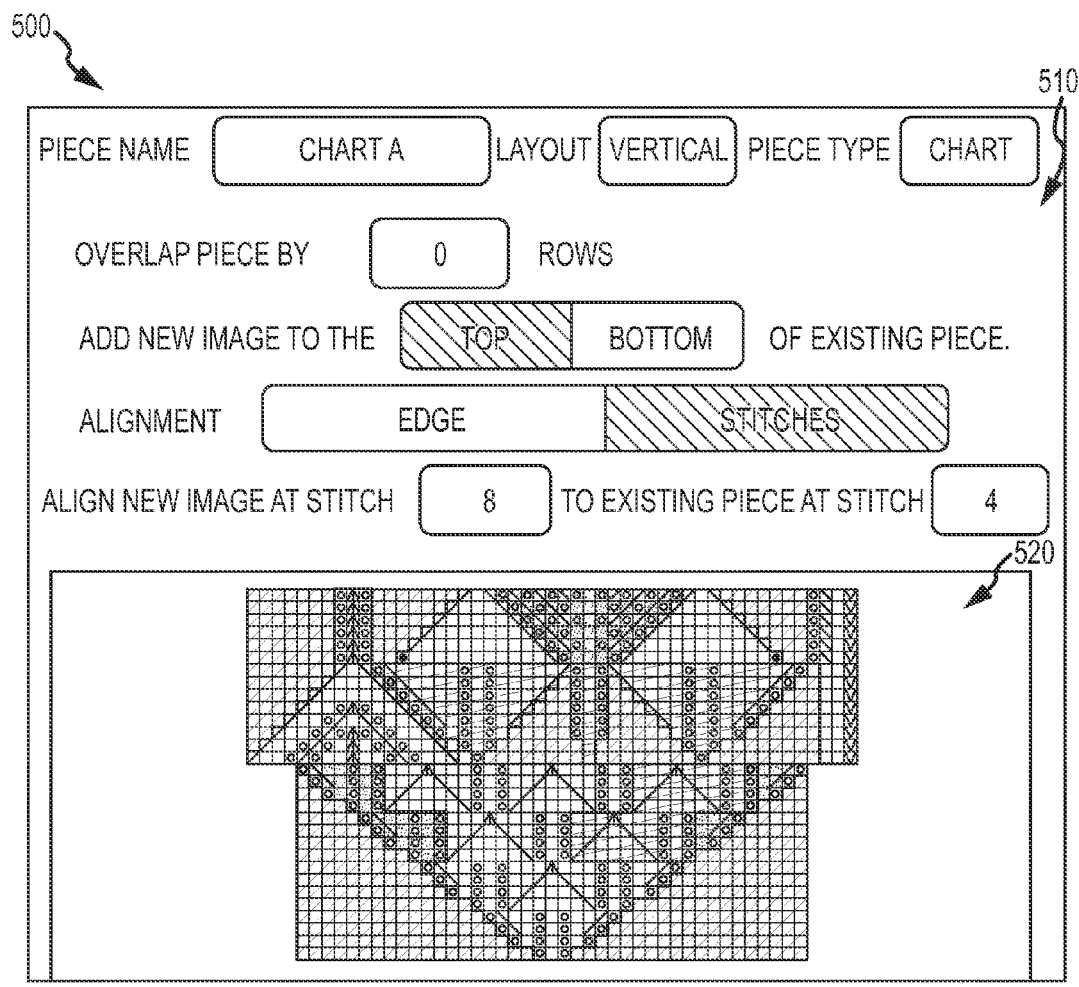
Figure 6:
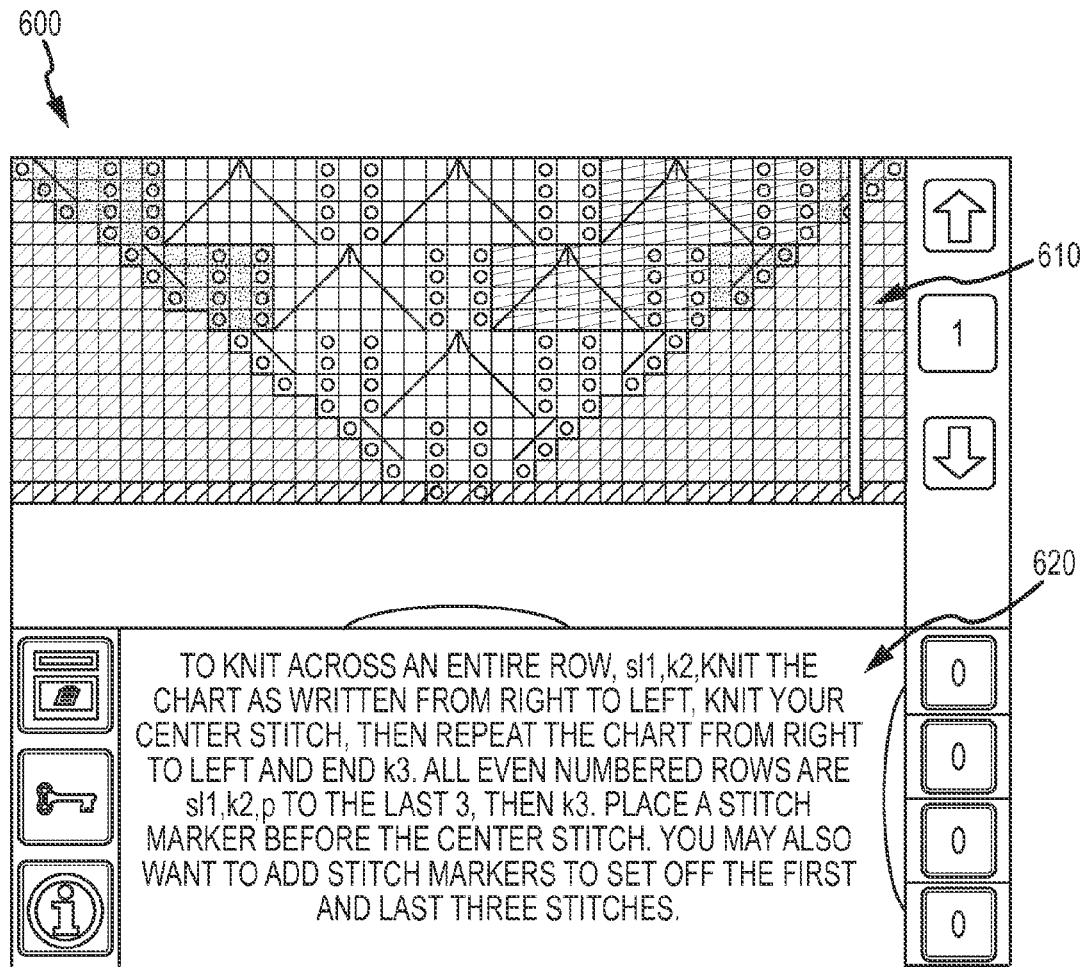

The present disclosure is described in conjunction with the appended figures:

FIG. 1 is a flow diagram of an embodiment of a method of constructing a complete project from disparate instructional content;

FIG. 2 illustrates an exemplary user interface for managing and interfacing with instructional content from one or more instructional manuals in which the content is in both written/text format and in graphical/chart format, and also illustrates the co-display of parallel instructions;

FIG. 3 illustrates an exemplary user interface for selecting an instructional part of interest and gathering specific scale information;

FIG. 4 illustrates an exemplary user interface for adding net new content to a combined instructional part;

FIG. 5 illustrates an exemplary user interface for combining two instructional parts;

FIG. 6 illustrates an exemplary user interface for a completed integrated instructional set of transformed electronic instruction manual; and FIGS. 7A-D are representations of an embodiment of a method of combining three instructional sub-parts of a knitting chart into a single integrated knitting chart.

DETAILED DESCRIPTION OF THE INVENTION

The ensuing description provides embodiments only, and is not intended to limit the scope, applicability, or configuration of the claims. Rather, the ensuing description will provide those skilled in the art with an enabling description for implementing the described embodiments. Preferred embodiments are described to illustrate the present invention, not to limit its scope, which is defined by the claims. Like elements in various embodiments are commonly referred to with like reference numerals. It being understood that various changes may be made in the function and arrangement of elements without departing from the spirit and scope of the appended claims.

Referring now to FIGS. 1-7, representations and configurations of the system and methods of manufacture are shown. Although embodiments of the present disclosure will be described in connection with applications to projects involving knitted garments, those of skill in the art will appreciate that the features disclosed herein may be applied to projects involving other fiber arts. Although the term "method" is used frequently, this term includes a system or systems that function to execute the method or methods.

An embodiment of a method of constructing a complete project from disparate instructional content in accordance with at least some embodiments of the present disclosure is depicted in FIGS. 1-7. FIG. 1 is a flow diagram of an embodiment of a method of constructing a complete project from disparate instructional content. FIGS. 2-6 are illustrations of embodiments of exemplary user interfaces implementing one or more of the elements of FIG. 1. FIG. 7 is a representation of an embodiment of a method of combining three instructional knitting chart sub-parts into a single integrated knitting chart.

A general order for the steps of the method 100 of a method of constructing a complete project from disparate instructional content is shown in FIG. 1. The method 100 starts with a start operation 101 and ends with an end operation 180. The method 100 can include more or fewer steps or can arrange the order of the steps differently than those shown in FIG. 1. Hereinafter, the method 100 shall be explained with reference to the systems, components, elements, etc. described in conjunction with FIGS. 1-7. The method 100 can produce a complete set of integrated instructions for a knitted garment.

At step 101 a project is started. The example discussed, as shown in FIGS. 2-7, is one in which at least a portion of a complete set of integrated instructions for a knitted garment is constructed. The method 100, although applicable to other applications requiring the construction of a complete project from disparate instructional content (to include, but not limited by, projects in the fiber arts), will be explained in terms of producing a complete set of integrated instructions for a knitted garment. A project would be initiated from the "Project" icon shown in the lower left of FIG. 7D. Multiple projects may be managed by system 100 simultaneously.

Content is received at step 110 of method 100. The content may be provided from one or more sources, such as existing knitting patterns and instructions. The content may be provided as a .pdf file or any available digitized format. (Note that the method 100 may also work with physical instructions once digitized by means or method known to one skilled in the art to transform physical materials into electronic or digitized form). Instructions may include text and graphics or figures (also known as "charted" instructions in knitting applications) such as detailed knitting instructions and knitting charts. Example text instructions are shown as 220 in FIG. 2, and example graphical (or chart) instructions are shown as within 320 on FIG. 3. Text content mat be scrolled using interface 230. Note that graphical or chart knitting instructions may use a variety of symbols to indicate stitch characteristics. Knit reference instructions are shown as 240.

Any collection of knit stitch instructions may be used as known to those skilled in the art. For example, the knit stitch instructions of as disclosed in U.S. Pat. No. 4,578,036 issued to Leighton on Mar. 25, 1986 ("Leighton"). Leighton discloses a method for instructions for knitting and crocheting in which the location, type, and number of each stitch is exactly indicated on a pattern piece scaled to the final shape of the finished item. Leighton is herein incorporated by reference in its entirety for all purposes.

The content received at step 110 may be provided in any available digitized format known to one skilled in the art to transform physical materials into electronic or digitized form). That is, it is not the physical source file format that matters, it is the nature of the file. All document-based formats, to include but not limited by, .pdf, .text, .doc, and .html may be received as source material for method 100. In addition, making an image of, or changing the physical file extension will have no bearing on method 100. Furthermore, method 100 may also receive, at step 110, documents that are scanned in from physical material. Also, method 100 may accept documents provided in any common orientation, to include, but not limited to, those read left to right and/or top to bottom, and those in landscape and/or portrait. Such instructional documents are commonly termed "linear" or "document-based," whether the document be a single page, set of pages, image, manual, or other functional nature.

At step 115, the content received at step 110 is modified. The instructions are typically provided in different formats as dictated by the vendor or manufacturer of the particular knitting instruction. As such, the instructions need to be assembled and modified to enable construction of an integrated knitted garment or knitted garment portion. Modification may take many forms, but typically may include re-arranging the order of the instructional steps, re-sizing the instructional steps, and reorienting the instructional steps. The knitting charts in many situations needs to be re-oriented, e.g. rotated from a portrait to a landscape presentation, and/or altered in size and/or cropped in order to be compatible with other and/or subsequent knitting instructions. A chart may also be flipped, i.e. presented as a mirror-image of itself. Also, the content of interest may need to separated from within a provided set of instructions. For example, perhaps a collection of knitting patterns is provided for seven different knitted socks, yet only the second such knitting pattern is of interest.

Additionally, at step 115, parts may be ordered into a logical sequence for the user, as dictated and selected by the user. When more than one part is defined, the parts can be ordered in relation to one another. This can be done without regard to where the parts were located in the original instruction manual. This is an example of net new content. Note that the original ordering of instructions in the original (input, i.e. received) instructional manual was driven by the requirement to save space and to provide uniform printing of the manual. In contrast, method 100 permits a different ordering that was either implicit or missing completely from the original content.

At step 120, instructional parts of interest are selected and reconfigured as required. Reconfigured may include resizing, cropping and re-orientating. During selection, the user selects one of several available sections, that is an instructional part, within an instructional document. For example, the user could select the instructional notes regarding the construction of a knitted garment, which provides details as to, for example, the direction of knitting of the garment component. The selection means, through a graphical user interface, may be by any means known to those skilled in the art, such as by point-click and highlighting a section. The selection may trim-out, or crop, areas not of interest, for example white-space, row number and/or stitch count. In FIG. 3, a depiction of a cropped area is presented 320. Note that the cropping has removed all but the chart knit instructions, that is, white space, row numbers and stitch count have been cropped-out. The user interface may be configured to zoom-in or zoom-out through, for example, taps by the user onto the user screen. Once a selection and/or a cropped selection is made, the user may input data regarding the characteristics of the cropped chart. In FIG. 3, at the display 310 the user has entered 16 rows, 41 stitches, identified the bottom row as 1 and "increment by" as 2 which provides that each row is repeated once. In this manner, the instructional part of interest has been modified. The instructional part is saved and may be accessed through the image bar 210. The "image bar" 210 may also be referred to as a "piece bar." For example, a cropped chart saved as "Chart A" would be assessable under that name as shown on FIG. 2 at 210.

In the selection step 120, the user defines the specific location of the instructions (within the larger instruction manual) that are relevant for that specific part. This may include text based instructions, diagrams, or charts. As part of selection, if the specific item selected is a chart with a standard scale for each cell in the chart (rows and columns), the user specifies the number of rows and columns. This information is highly relevant in the additional aspect of combining parts to form entire sub-tasks. The nature of the selection is location-based and can be used to exclude all non-essential information that does not advance an understanding of the given instructions. This may include removing superfluous information and/or removing options that are not relevant.

A first step to selecting a part is selection of the page within the instruction manual on which the part can be found. Referring now to the exemplary user interface 300 of FIG. 3, it is necessary to specify exactly what content on the selected page is to be included in the part and what content is not to be included. Selection may be made through the graphical user interface by highlighting the desired section. For example, the boxed knitting graphic of 320 may be highlighted and then selected. This selection can be made precise to the pixel level available on the electronic system. The method of making the selection involves using one or more of the provided controls (sliders, located adjacent to 320 on top, bottom, right and left sides) to highlight the desired (and consequently undesired) section of the page. Once the desired selection is marked, the part is deemed selected and is available as a transformed electronic instruction. The process of selection is identical for all parts, be they normal instruction parts (instructions in the form of chart, diagram, text, etc), reference parts, template parts, or parallel instruction parts.

Once a selection is made, a "new part" will be created. The new part will subsequently appear on the image bar 210 and thus be available for immediate or future use and/or access. The new part is electronically stored. Additional new instructional parts of interest may also be selected, similarly appear on the image bar and similarly be electronically stored. The instructional parts selected may be of types including text and figures (i.e. "charted") instructions. During the select instructional parts of interest of step 120, the user may also select content from more than one page of content.

At step 125, the instructional parts selected during step 120 are assembled and edited as required. Once a first part is created, it is then possible to add a part to the existing part. The method for this involves selecting the page of the instruction manual in which the new part is located. It may or may not be the same page as the part being added to. The same method as was used to create the existing part is then used to select the specific portion of the page that contains the content for the part to be added. Once selected, it is now necessary to align the existing part and the new part in relation to each other in such a way that the logical instructions are followed. FIG. 5 represents an embodiment of the choices available to align the two parts. Overall, the two parts are aligned in relation to each other (at screen portion 520 of exemplary user interface 500). Selections are driven by a hierarchy of information. User interface options are shown at 510 of exemplary user interface 500. The highest level is if the new part is to be added horizontally or vertically in relation to the existing part. A selection of Horizontal will further specify the options of alignment to include adding the new part to the left or right of the existing part. Overlap will be specified in pixels (or columns if the part is a chart) and will cause the new part to lie on top of the existing part either to the right or left based on selection. The new part can also be aligned at the top or bottom edge, or to a specific set of pixels (or rows if the part is a chart). If however, a selection of Vertical is made, the set of options further specified will be as follows. With a Vertical selection, the new part can be added at the Top or Bottom of the existing part. Overlap is specified in pixels (or rows if the part is a chart) and will cause the new part to lie on top of the existing part either at the top or bottom of based on selection. The new part can also be aligned to the left or right edge of the existing part, or to a specific set of pixels (or columns if the part is a chart). In this way, the user can fully specify the graphical layout of both parts in relation to each other in two dimensions. The resulting assembled part can now be viewed as a single part, and can be assembled with other parts in order to complete the necessary instructions for that particular part. It should be noted that if the assembled parts are chart parts, then as part of the assembly process the method 100 automatically scales the parts so all rows and columns are equivalent in scale regardless of representation in the original instruction manual. An additional representation of combining graphical layouts, i.e. knitting charts, is provided in FIGS. 7A-D and associate discussion.

At step 130, a query is made as to whether instructional sub-part content is to be added. Sub-part content may include user material and reference material. Reference material may include, for example, key or legend information that maps a knitting icon to a particular type of knitting stitch. Such a specialized content part can be viewed at the same time as any other non-specialized part, on the same screen. This provides the user the ability to have easy and immediate access to required reference information while following specific instructions within a part. If instructional sub-part content is to be added, such content is added at step 135 and the method 100 proceeds to step 140. If no instructional sub-part content is to be added, the method 100 proceeds to step 140.

User-provided net new multi-media content added at step 130 may include, but not be limited to, plain text, lines, images, audio clips and video clips. User-provided or user-created content may be created and optionally modified before execution of the instructions or during execution of the instructions. There are two general types of content: user-created and user-modified. User-created content is content—such as text, audio, video or even other final parts—that the user creates. The user then associates this content with existing parts, or with triggers such as achieving instruction row. User-modified content is content that already exists by having been received at step 110, but that the user can interact with—such as moving the current row marker, moving slider rows to follow progress across a row, counter information where the user can increment or decrement counters when instructions require repetition, scale and location of final parts, chosen reference material, order of instruction (final part) execution, etc. This ability for the user to dynamically affect the content of the instruction manual provides a level of content depth that does not exist in traditional systems.

The exemplary user interface 400 of FIG. 4 depicts three separate types of net new content that users can create and modify either before or during execution of the instructions. Although the content itself may be considered very similar to document-based annotations, what differentiates this content is where it can be placed, and when and how it can be modified. The content can be associated with an instruction part, with reference material, with the association between parts (which is not a physical entity) or with a level of progress (also not a physical entity).

The exemplary user interface 400 of FIG. 4 depicts several examples net new content and/or information. In the main panel 420 is a table, where existing or net new content is associated with the rows of an existing chart piece (such as a nominal instructional part). Area 410 provides chart identifying name, number of rows, bottom row number and increment number. At main panel 420, secondary (parallel) content may be created and associated with rows of a part (in this case, a Chart piece.) By tapping the "plus" icon on the left column of the table, the process of creating a new piece may be triggered—but instead of being a final (top) level piece, it would be a parallel piece that is associated only with the selected row. Tapping the plus icon on the right side of the screen allows for the creation of other user-defined content, such as audio or video clips, and free-format typing of content. In both cases, the content may be copied among rows (using an additional screen, not shown).

After having configured parallel pieces and other user-defined content, and mapping or associating with it applicable rows of a row-based piece (which could be a chart or a text-based piece), the parallel pieces and other user-defined content may now be accessed when the user is executing the piece. This can be seen in FIG. 6, where the current row is shown as (cross-hatched) row 1. (The cross-hatching is intended to indicate a highlighting of row 1 by the user). Note that from FIG. 4, row 1 has associated with it a parallel instruction. In the secondary view window of 620, the parallel instruction associated with row 1 is provided. When the user completes row 1 (taps the up arrow icon in 610), then this parallel instruction will disappear. Next, a query will occur as to whether there exists another parallel instruction for row 2. If there is not, then a query will occur as to whether there is some reference material to be shown. If there is not, then the default will be to show whatever user-defined project-level information the user may have entered.

There are three levels of content associated with the three buttons at the left margin of 620. Although not shown in FIG. 4 or FIG. 6, when the user was at row 1 an audio clip could be triggered (since there was a row media icon associated with row 1 of FIG. 4), or a video clip or some user-defined text. Such triggers are selectable and adjustable based on how any particular content is configured; for example, whether to be shown automatically upon achievement of a particular row or whether to be shown only when the user taps the applicable button.

It is important to note that the parallel instruction will not display until the user reaches the relevant portion of the instruction part to which the parallel instruction(s) apply. This "on demand" appearance of the parallel instruction reminds the user to perform both the instruction part instruction as well as the parallel instruction. For purposes of explanation, an example of ten steps in an instruction part is presented as follows. On step 5 the user needs to perform both step 5 and a second set of parallel instructions at the same time, while for steps 1-4 and 6-10 the user only needs to do the instructions in the part. During steps 1-4 of the instructions, the parallel instructions will not be displayed. Upon moving to step 5, the parallel instructions will appear so the user can perform both instructions. Then when the user moves to step 6 the parallel instructions will disappear. The information in the parallel instruction part does not need to co-reside with information in the instruction part. The ability to combine information from across the instruction manual in effect creates content in a highly usable form which provides the practical application and end goal of this invention. The method of creating a parallel instruction part begins with selecting the page on which the reference material exists in the instruction manual. Parallel instruction parts may also be assembled from several parts using the same method as instruction parts.

The secondary view window of 620 may also present text that provides additional instructions for the user (such as what next task to perform) or, for example, how to prepare for instructions on a particular row. In addition to this secondary content, an audio clip may play (the audio clip not being part of the original content at all, but being added as net new content in order to remind the user of what to do). Both the secondary view, and the audio clip cue, can be original content from the publisher, or net new content added by the user before or during execution of the instructions. FIG. 5 indicates how this net new content can be associated with the user's progression through the instructions. In the presentation of FIG. 4 at 420, there is both a text and multi-media (audio in this case) content that will be triggered (shown or played) when the user gets to row 1 and row 17, respectively.

FIG. 6 illustrates, among other things, the relationship between original instructions (which may be formed from several components of instructional materials) as presented in main or primary display 610 and content presented in secondary display 620. At 620, parallel instructions or the reference materials may be presented. The content of 620 may selectively be presented automatically, as triggered by a user's progress through the original instructions, or manually through button icons on the left side of 620. The three buttons on the left side of 620 provide three different display options for secondary display 620, so that the user can override any selectable automatic settings. If there is a parallel instruction for a given row (or line) of a piece, the parallel instruction may be shown in 620. If there is no parallel instruction for the current row, then the current reference material piece may be shown (note that if there are multiple reference materials associated with a given instruction, the user may cycle through the reference materials by tapping the second icon on the left of 620). If there is no reference material piece associated with a given instruction, then some user-defined project-level instructions may be presented in the secondary view. Again, the user can selectively bring-up any of the three levels of secondary content manually by tapping the appropriate button to the left of display area 620, to include a view containing any user-created audio, video or text content. The ability to combine information from across the instruction manual in effect creates content in a highly usable form which is a practical benefit of the method 100.

Note that creating a reference instructional part begins with selecting the page on which the reference material exists in the instruction manual, as received at step 110. The method of selecting the specific reference information is the similar to selecting content for a graphical instruction, as described above and depicted in FIG. 3. Reference instructional parts may also be assembled from several instructional parts.

At step 140, a query is made as to whether any further editing of added instructional sub-part content is required, such as adding or subtracting content and re-ordering of content. If further editing is required, the method 100 proceeds to step 145 and the editing occurs, and then the method 100 proceeds to step 150. If further editing is not required, the method 100 proceeds to step 150.

At step 150, a query is made as to further editing of the nominal instructional part is required (to reflect the addition of instructional sub-part content). If editing of the nominal instructional part is required, the method 100 proceeds to step 125. If no further editing is required, the method 100 proceeds to step 155.

At step 155, the instructional sub-part content is assembled with the nominal instructional part. FIG. 5 illustrates an exemplary user interface for combining two instructional parts. Step 155 may involve combining one part with an existing part and may be repeated multiple times as needed to achieve the required final part as described or dictated by one or more instruction manuals. In assembling parts together, the method 100 allows for the user to locate two parts in reference to each other in two dimensions. In addition, for parts that are charts with rows and columns, the method 100 or system allows the ability to scale the two parts being combined so that all rows and columns in the combined part align, even if in the original instruction manual the scale of the parts in question were different. The process of combining (or adding) a part to a part can be repeated as needed. This enables the user to easily combine into a single part, instructions that may span multiple pages, even if those pages are not contiguous. FIG. 2 depicts, at image bar 210, all final parts for a currently open or active project.

A set of unique structures for selecting which sub-sections of content are to be used in assembling new parts may include information such as location, size and scale information gathered during the process of selecting content from the original source material. The assembly structures of method 100 include content such as: final scale, relevant positions, rotation, and orientation of each selected sub-part that makes up a final part. All final parts can be fully reassembled from original instruction material, persisted structures and net new content. Re-assembly enables the overall portability of the assembly as well as the ability to backup, track, and maintain changes, by significantly reducing the transmission size and storage of the assembly. Structures to depict and persist the multiple forms of net new content may be of various formats. Although these structures may be specific to the type of content being creating, and may include elements such as original file locations, user entered information, and tracked changes over time.

At step 160, the completed integrated instructional set is presented to the user for execution. FIG. 6 illustrates an exemplary user interface for a completed integrated instructional set of transformed electronic instruction manual, depicting how net new content can be associated with user's progress, the co-display of reference material and parts.

FIG. 6 illustrates an exemplary user interface for a completed integrated instructional set of transformed electronic instruction manual, depicting how net new content can be associated with user's progress, the co-display of reference material and parts. The final parts (which are made up of the sub-parts) may be listed across the top (not shown in FIG. 6, but shown in FIG. 2 at 210), and are selectable by the user for execution of those instructions. When a final part is selected, it is analyzed for links and associations and if there are any, the screen is configured to show them. This is completely context-sensitive, based on the meta-information for each final part, as well as other information and associations created by the user. The panel to the right of the screen 610 provides one embodiment of a mechanism for tracking user progress through each final part (up and down arrow buttons and number label in a box) This panel has two purposes; 1) it tracks the instructional row that the user is currently on, and 2) it also triggers those previously created associations, so that the bottom panel 620 (termed a multi-function display) shows the correct associated content. This content can be one of a number of options depending upon the meta-information gathered and associations made. For instance if the current row has a related instruction—that could pop up immediate in this multi-function panel. Another option for a row association might be a multi-media message (audio, video or just text) that the user leaves herself. If there is no row-specific associated content, then the system or method 100 will default to showing reference material. Reference material is a type of final part that is tagged as being reference material. Examples include a glossary, key or legend, table of contents, index, etc. These reference material parts are associated with any final part and the method 100 supports any number of them. This allows users to toggle between several sub-sections of instructions, while keeping their current final part progress in the main window.

At step 165, a query is made as to whether user activity tracking should be enabled. The user may be queried or the system may be set to automatically track user activity. If user activity is to be tracked, step 170 is performed, and then the method 100 proceeds to step 175. If no tracking is to be performed, the method 100 proceeds to step 175 after the query of step 165 is made.

Tracking of user activity (step 170) may include maintaining status of where the user is within the project as dictated by the integrated instructional set. Tracking may be performed with respect to either or both of written instructions and graphical/chart instructions. In a knitting application, this may include row number and particular stitch to next be executed. At the highest level, progress is tracked as parts are accomplished and progress is made along a parts thumbnail (not shown in FIG. 6, but shown in FIG. 2) at the top of 600 (progress of selected part indicates parts completed to the left and parts remaining to the right as well as current/selected part). Tracking also becomes more detailed for progress within a part including both the specific row being knit and potential the location along that row. Users may also mark which row of instructions they are currently working on and/or mark which part they are currently working on. This tracking also makes it clear what the previous and next instruction (based on the desired ordering) will be. Again, this is content that does not (and cannot) exist in the original instructions because those instructions are static and set up before the user starts to use the instructions. Thus, the method 100 is dynamic and allows for the user to track their progress through the instructions over time, so their path through the instructions is persisted.

Some aspects of tracking are depicted in the slider bar of in area 220 of FIG. 2. The slider bar may be configured to control a movable slider line such that a user can track their horizontal and location on an instruction line. The user may move the slider bar continuously to assist in tracking their location on a current row. Another slider bar may be positioned vertically to the right and/left sides of area 220 to allow the user to track their progress when proceeding up and down a list of instruction rows. Additionally, up and down arrow buttons 230 allow movement on area 220 and may further be identified with a box presenting the row number.

The ability to track user activity may be viewed as a culmination of many of the previous steps in method 100. Tracking may only be performed if the original instructions are properly and completely formatted—there must be structure in informational content in order to track progress. If one does not assemble the sub-parts into final parts, then the structure to know when a step has been completed is lacking For example, traditional instructional manuals would, at such a junction, query the user such as "see figure abc to get a better idea of how to perform the step that you think that you just finished." Only once the various sub-parts are assembled into one cohesive instruction part can one be confident that the step has been finished. Similarly, if the user is not allowed to add their own content (reminders to themselves or markers to assist them in properly executing a step of instructions,) then it is likely that they will perform the step incorrectly or incompletely, or the instruction will take much longer due to confusion.

Also, a user may add their own specialized information about their progress in a manner similar to how a user's progress through instructions is tracked. Note that this is not the same as adding content directly to a document (such as adding annotations to a document.) Instead, this feature involves adding changeable, movable information and content to the view of the assembled document. This information only makes sense in the context of assembled parts—because the information links content from multiple locations in the original document to metadata that is specific to how the user (or publisher) assembled the pieces. Examples of this function include allowing the user to associate, for example, highlights, markers, text, audio and video annotations to the various assembled parts, and allowing the user to change and update this content as they progress through the instructions. All of this information is stored externally to the original instruction manual—because there really is no single place to store such information within the static structure of the original manual.

At step 175, a query is made as to whether the project is complete. If the project is not complete, the method 100 proceeds to step 160. If the project, for example in a knitting application the section of garment to be knitted, is completed, the method ends at step 180.

Another step (not shown) of the method 100 is the ability to define a part as a template or stencil. As such, this specialized part can be included repeatedly in the assembly of other parts. When instructions must be repeated multiple times, this significantly reduces the effort of selection because the specialized template part is already selected and available without further selection required. Templates can be created using the process of selection and assembly specified above.

Another step (not shown) of the method 100 is the trigger function (not shown). More specifically, one or more triggers may be established that perform a specific function as triggered by an event. One trigger seeks parallel instructional parts that may need to be displayed to the user (such as concurrent or parallel instructions that are to be performed) when a user begins a particular, or any, instructional step. Alternatively or additionally, the trigger may seek reference material to be displayed and/or user-defined material for display. The trigger may be influenced as to prior activity of the user, for example, if the user consistently executes the same stitch type incorrectly, the method 100 may always display reference notes regarding that stitch whenever that particular stitch is to be executed.

FIG. 7 presents a representation of an embodiment of a method 700 of combining three instructional sub-parts of a knitting chart into a single integrated knitting chart. FIGS.

7A-D describe steps 702, 704, 706 and 708 of method 700, respectively. The example illustrated describes the use of method 100 to construct integrated graphical (i.e. knitting chart) instructions from three disparate graphical instructions for a portion of a knitted sock garment. Specifically, the knitting chart content of three knitting areas, 710, 720 and 730, is provided at step 702 (analogous to step 110 of method 100 as shown in FIG. 1). The three knitting areas 710, 720 and 730 are selected and cropped as required at step 120, resulting in three knitting charts cropped as shown at step 702. Note that each of 710, 720 and 730 have been cropped to remove, e.g. white-space, row number and/or stitch count. In this example, charts 720 and 730 are of the same scale, but chart 710 is of a different scale. At step 704, knitting chart 710 is positioned near and below chart 720, to, among other things, visually verify the scale of 710 and 720 are different. Also, at step 704, chart 730 is positioned to be left of chart 720 so as to begin alignment of their instructional content (here, knitting rows) and visually confirm that chart 720 and 730 are of the same scale. At step 706, charts 730 and 720 are aligned, and chart 710, still of a different scale than charts 720 and 730), is positioned below chart 720. Note that in regard to the alignment of charts 720 and 730, the alignment is with respect to the instructional information content of each of 720 and 730 (here, the knitting instructions residing in each of the boxes of the charts), as distinguished from the simple alignment of the tops of the instructional chart images of 720 and 730. At step 708, chart 710 is re-sized (here, enlarged) so as to present in the same scale as chart 720 and 730, and aligned with chart 720. The steps of 704, 706 and 708 are analogous to step 120 of method 100 as shown in FIG. 1.

Figure 7A:
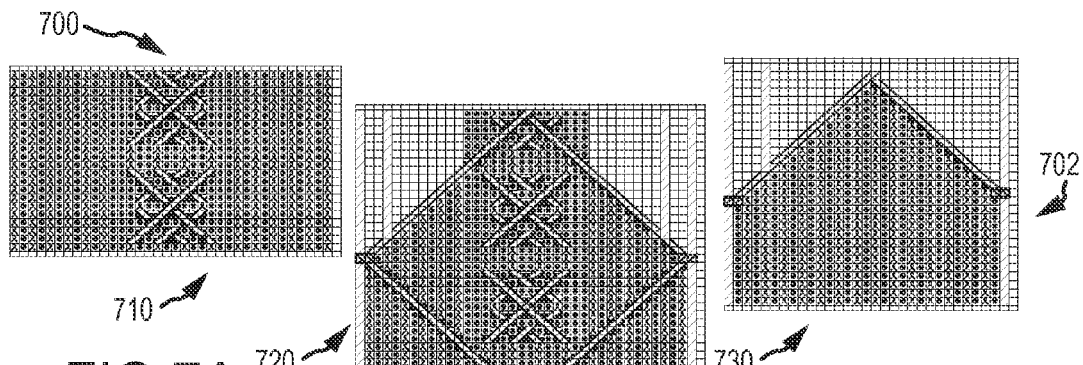
Figure 7B:
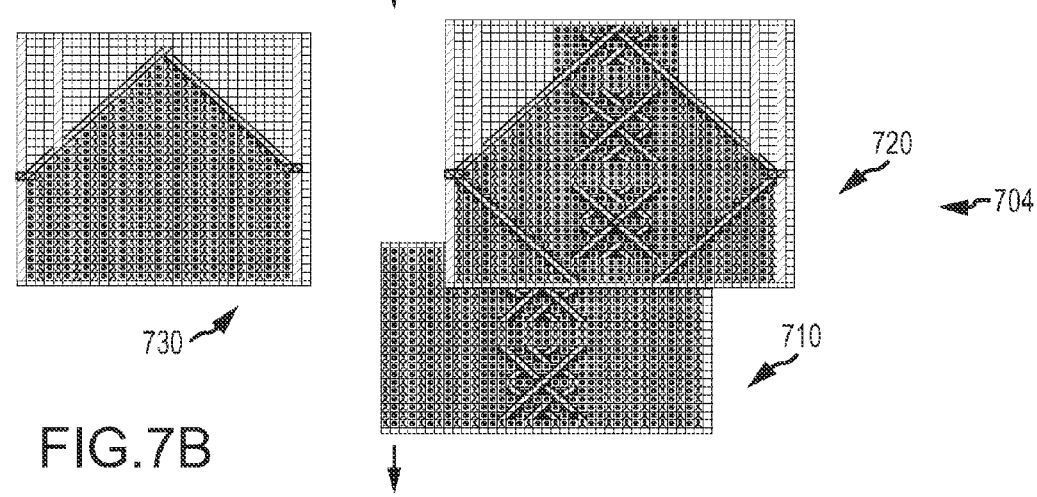
Figure 7C:
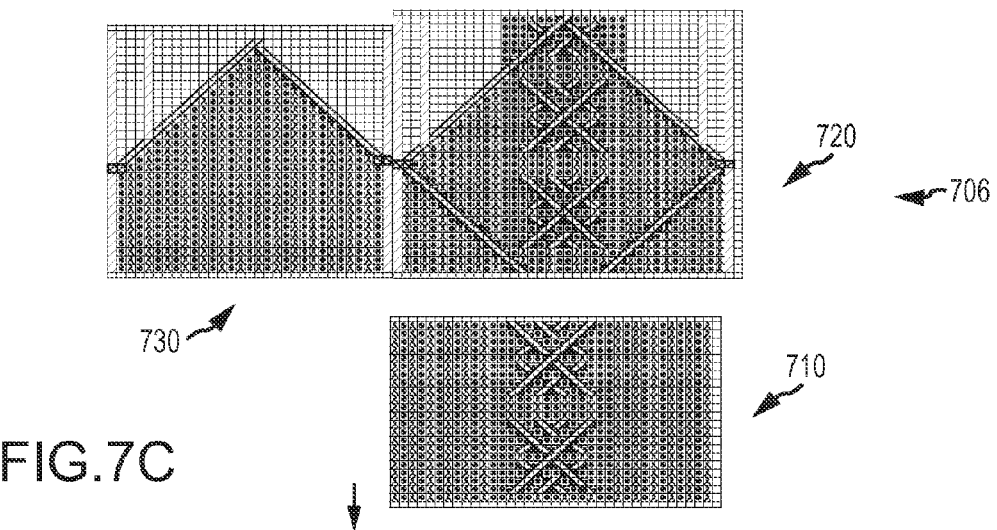
Figure 7D:
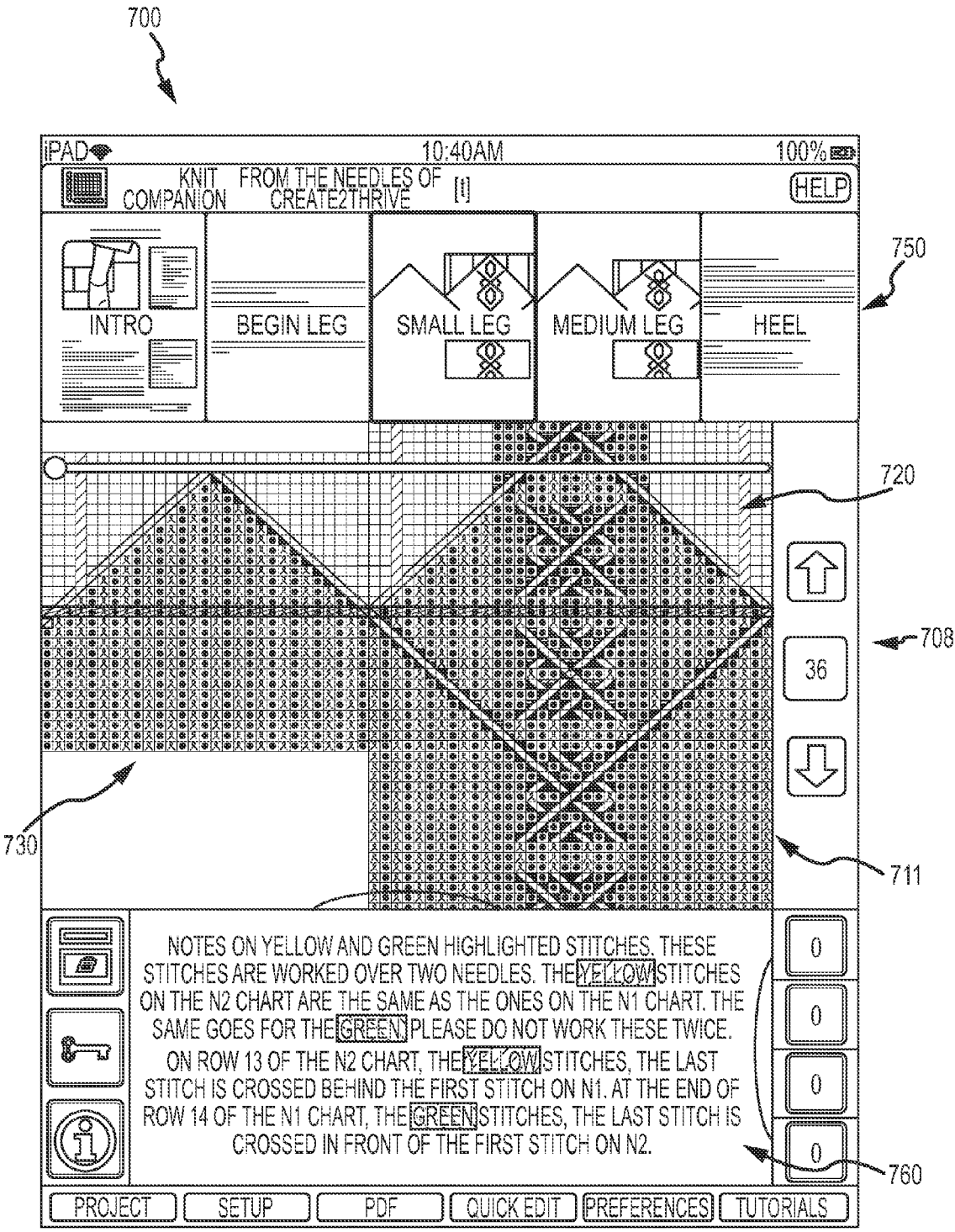

Note that once method 700 is completed, which provides an integrated graphical set of instructions (here an integrated knitting chart), companion written instructions may be created. In FIG. 7D, specific written instructions to execute in parallel with the integrated knitting chart on specific rows is presented (here, specific written instructions to execute in conjunction with Row 36 are illustrated). This illustrates to need for and the function of the system 100 to co-display instructions (here, graphical/chart with text/written) with reference material and parallel parts.

Also illustrated in FIG. 7D is the ability to track progress (in this case on a chart, but the same is available and necessary for written instructions). At the highest level, progress is tracked as parts are accomplished and progress is made along the parts thumbnail at the top image bar 750 (progress of selected part indicates parts completed to the left and parts remaining to the right as well as current/selected part). Tracking also becomes more detailed for progress within a part including both the specific row being knit and potential the location along that row. Reference notes are depicted as 760.

The tracking bar, shown as a highlighted row within 720, is a digital version of a row pattern position marker used in traditional manual knitting operations. An example of a traditional manual knitting operation with position monitoring is provided, for example, in U.S. Pat. No. 4,391,591 issued to Hamburger on Jul. 5, 1983 ("Hamburger"). Hamburger discloses a device for holding a knitting pattern and for indicating the pattern position. The pattern is held to a pattern support face of a pattern support member by a clip member. The pattern position is recorded and visually summarized at a single location by a single notation member. Specifically, the notation member includes an elongated bar member movably mounted on the pattern support member for visually underscoring the row of the pattern. Further, and simultaneously, the notation member includes members for indicating other pattern information, shown in a first preferred form as indicators slidably mounted in grooves formed in the elongated bar member and in a second preferred form as pegs receivable in apertures formed in the elongated bar member which indicate the pattern position by indicating numerals forming a pattern position guide. Hamburger is herein incorporated by reference in its entirety for all purposes.

FIG. 7D represents the method for providing the user the ability to view all instruction parts in their logical order, view the selected instruction part and navigate each step of the selected instruction part, and view reference materials 760 as well as parallel instructions. All of this information is available simultaneously, regardless of the information's location in the original instruction manual, the manual's layout or ordering. In addition, progress in working instruction parts as well as progress within a given part is automatically tracked and recallable so the user never loses the spot they are in the specific instructions.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

From the foregoing, the advantages of the present invention are readily apparent. The method provides a way of constructing a knitted garment from disparate instructional content that is more efficient, effective and satisfying to a user.

What is claimed is:

1. A method of constructing at least a part of a knitted garment by a user, comprising:
   providing a non-transitory computer readable medium having stored thereon computer-executable instructions;
   providing a display screen device;
   receiving electronic instructional content from a plurality of instructional manuals, the instructional content comprising a plurality of instructional parts;
   selecting a plurality of instructional parts to enable construction of at least part of a knitted garment;
   editing the plurality of instructional parts to create at least one edited instructional part;
   receiving user content;
   assembling the at least one edited instructional part with the plurality of instructional parts and the user content to create an integrated assembly instruction set;
   presenting the integrated assembly instruction set to a user by at least one of a user interface, a display screen device, a printed document and electronic voice instructions;
   tracking the progress of the user with respect to at least one of: i) a row of instructions, and ii) the plurality of instructional parts of the integrated assembly instruction set; and
   constructing at least a part of a knitted garment by the user.

2. The method of claim 1, wherein the instructional content is at least one of textual data and graphical data.

3. The method of claim 2, wherein the integrated assembly set is presented to the user by a display screen device.

4. The method of claim 3, wherein the user content comprises at least one of plain text, lines, images, audio clips and video clips.

5. The method of claim 1, wherein the electronic instructional content is configured in a format selected from the group consisting of .pdf, .text, .doc, and .html.

6. The method of claim 1, wherein the integrated assembly set is presented to the user by a display screen device.

7. The method of claim 5, wherein the integrated assembly set is presented to the user by a display screen device.

8. The method of claim 7, wherein the user content comprises at least one of plain text, lines, images audio clips and video clips.

9. A non-transitory computer readable medium having stored thereon computer-executable instructions, the computer executable instructions causing a processor of a device to execute a method of constructing at least a part of a knitted garment by a user, comprising:
   instructions to receive instructional content from a plurality of instructional manuals, the instructional content comprising a plurality of instructional parts;
   instructions to select a plurality of instructional parts to enable construction of at least part of a knitted garment;
   instructions to edit the plurality of instructional parts to create at least one edited instructional part;
   instructions to assemble the at least one edited instructional part with the plurality of instructional parts to create an integrated assembly instruction set;
   instructions to present the integrated assembly instruction set to a user;
   instructions to track the progress of the user with respect to at least one of: i) a row of instructions, and ii) the plurality of instructional parts of the integrated assembly instruction set;
   instructions to construct at least a part of a knitted garment by the user.

10. The medium of claim 9, wherein the instructional content is at least one of textual data and graphical data.

11. The medium of claim 9, wherein the instructional content is configured in an electronic format selected from the group consisting of .pdf, .text, .doc, and .html.

12. The medium of claim 9, wherein the integrated assembly set is presented to the user by a display screen device.

13. A data processing system comprising a non-transitory computer readable medium having stored thereon computer-executable instructions, the computer executable instructions causing a processor of a data processing system to execute a method of constructing at least a part of a knitted garment by a user, the system comprising a plurality of instruction set comprising:
   an instruction set for receiving electronic instructional content from a plurality of instructional manuals, the electronic instructional content comprising a plurality of instructional parts;
   an instruction set for selecting a plurality of instructional parts to enable construction of at least part of a knitted garment;
   an instruction set for editing the plurality of instructional parts to create at least one edited instructional part;
   an instruction set for assembling the at least one edited instructional part with the plurality of instructional parts to create an integrated assembly instruction set;
   an instruction set for presenting the integrated assembly instruction set to a user;
   an instruction set for tracking the progress of the user with respect to at least one of: i) a row of instructions, and ii) the plurality of instructional parts of the integrated assembly instruction set; and
   a module for constructing at least a part of a knitted garment by the user.

14. The system of claim 13, wherein the instructional content is at least one of textual data and graphical data.

15. The system of claim 13, wherein the system further includes an instruction set for receiving user content wherein the user content is combined with the integrated assembly instruction set.

16. The system of claim 15, wherein the user content comprises at least one of plain text, lines, images, audio clips and video clips.

17. The system of claim 13, wherein the electronic instructional content is configured in a format selected from the group consisting of .pdf, .text, .doc, and .html.

18. The system of claim 13, wherein the integrated assembly set is presented to the user by a display screen device.

19. The system of claim 15, wherein the integrated assembly set is presented to the user by a display screen device.

20. The system of claim 19, wherein the user content comprises at least one of the plain text, lines, images, audio clips and video clips.

* * * * *